United States Patent [19]
Gudernatsch et al.

[11] 3,926,810
[45] Dec. 16, 1975

[54] APPARATUS FOR THE AERATION OF EFFLUENT WITH OXYGEN-CONTAINING GAS

[75] Inventors: Hugo Gudernatsch; Gerhart Jaekel, both of Hermulheim; Wolfgang Kroll, Gross-Konigsdorf; Volker Oden, Cologne; Konrad Reinhardt, Erftstadt Kierdorf, all of Germany

[73] Assignee: Hoechst Aktiengesellschaft, Frankfurt am Main, Germany

[22] Filed: June 21, 1974

[21] Appl. No.: 481,810

[30] Foreign Application Priority Data
Sept. 8, 1973  Germany............................ 2345405

[52] U.S. Cl. ................ 210/220; 261/122; 261/124
[51] Int. Cl.² ........................ B01F 3/04; C02C 1/12
[58] Field of Search ......... 210/15, 63, 14, 199, 220, 210/221; 261/77, 122–124

[56] References Cited
UNITED STATES PATENTS

| | | | |
|---|---|---|---|
| 803,068 | 10/1905 | Plantinga | 261/122 |
| 1,642,051 | 9/1927 | Wall | 261/122 |
| 1,873,843 | 8/1932 | MacDonald | 261/122 |
| 2,770,319 | 11/1956 | Hagenbook | 261/124 X |
| 3,154,602 | 10/1964 | Geiger | 261/124 X |
| 3,315,895 | 4/1967 | Klingbeil et al | 261/122 X |
| 3,424,443 | 1/1969 | Thayer | 261/124 X |
| 3,432,154 | 3/1969 | Danjes | 261/124 X |

FOREIGN PATENTS OR APPLICATIONS

| | | | |
|---|---|---|---|
| 195,120 | 3/1965 | Sweden | 261/124 |
| 289,801 | 10/1931 | Italy | 261/122 |
| 813,995 | 9/1951 | Germany | 261/124 |

*Primary Examiner*—Thomas G. Wyse
*Assistant Examiner*—Robert H. Spitzer
*Attorney, Agent, or Firm*—Connolly and Hutz

[57] ABSTRACT

Effluent is aerated with oxygen-containing gas in an aeration basin. The basin subdivided into two halves is comprised of a plurality of aeration boxes which have flattened horizontal and perforated upper ends for the passage of the oxygen-containing gas therethrough, are connected together by means of a conduit, are placed side by side, are spaced apart from each other and are disposed along one of the longitudinal sides of the aeration basin. Transverse walls support the individual aeration boxes. A partition wall is secured perpendicularly to the transverse walls. The partition wall is dipped in the basin, subdivides the two basin halves into two further halves, terminates above the bottom of, and below the effluent level in, the basin.

The aeration boxes are made of plastics material, have a rectangular cross-sectional area, open lower ends and gas outlets centrally surrounded by a counterbore.

6 Claims, 5 Drawing Figures

APPARATUS FOR THE AERATION OF EFFLUENT WITH OXYGEN-CONTAINING GAS

The present invention relates to an apparatus for the aeration of effluent with an oxygen-containing gas in an aeration basin subdivided into two halves receiving the effluent, the basin being comprised of a plurality of aeration boxes having flattened horizontal and perforated upper ends for the passage of the oxygen-containing gas therethrough, being connected together by means of a conduit, being placed side by side, being spaced apart from each other and being disposed along one of the longitudinal sides of the aeration basin; of transverse walls supporting the individual aeration boxes; and of a partition wall secured perpendicularly to the transverse walls, the partition wall dipping in the basin, halving the two basin halves, terminating above the bottom of, and below the level of the effluent in, the basin.

German Pat. No. 1,250,372 describes an apparatus permitting effluent to be aerated with a gas, wherein use is made of an aeration basin of which the individual aeration boxes have flattened horizontal upper ends provided with a plurality of perforations disposed in rows.

A further gas aerator has been described in German Pat. No. 1,254,546, wherein the individual aeration boxes having substantially even lower ends are arranged opposite directional, and substantially perpendicularly, to the direction of flow of the effluent. The aeration boxes used therein have flat upper ends which are mechanically stronger, e.g. made of stainless steel, than all their other boundary walls.

The above known devices are, however, not fully satisfactory, as their gas outlets tend to become clogged by material which cakes together, such as activated sludge or calcium carbonate calcium phosphate. In addition to this, the gas outlets are difficult to clean as it is necessary for the complete aeration system to be removed and for the individual aeration boxes to be dismounted.

The present invention now provides an apparatus for aerating effluent by flowing an oxygen-containing gas through gas outlets which are not likely to become clogged and which avoid the need for expensive control and maintenance of the gas aeration system. The present invention relates more particularly to an apparatus provided with plastics-made aeration boxes having a rectangular cross-sectional area, an open lower end and gas outlets centrally surrounded by a counterbore.

Further features of the present invention provide:

a. for the aeration boxes to be made of polyethylene;

b. for the aeration boxes to have a height, in mm, greater than the difference between the maximum pressure produced by a blower, in mm water, and the distance between the upper end of the aeration boxes and the effluent level, in mm;

c. for the lower ends of the aeration boxes to be formed with flanges;

d. for the flange to be directed outwardly;

e. for the counterbore to include an angle $\alpha$ of at least 90°;

f. for the counterbore to include an angle of 120°;

g. for the gas outlets to be provided with counterbores penetrating into the plastics so as to leave a residual wall thickness $a$ between 0.5 and 2 mm, preferably 1 mm;

h. for the terminal surface areas of the aeration boxes to be provided with weld seams;

i. for a plurality of aeration boxes to be secured with their terminal surface areas to, and to be supported by the horizontal angle side of, an angle piece.

The use exclusively of plastics, e.g. polyethylene, for making the aeration boxes with their open lower ends, enables substantial economies to be effected in producing the aeration system, as compared with the costs incurred by the use of steel and stainless steel or plastics and stainless steel.

The counterbores provided in accordance with this invention prevent activated sludge, for example, from caking together within the region of the gas outlets, and simultaneously enable the effluent to be aerated with fine bubbles of gas, which ensure an optimum passage of oxygen from the oxygen-containing gas to the effluent.

The aeration boxes should have a height which prevents gas from escaping downwardly therefrom, up to the maximum pressure of the gas blower used.

To improve their dimensional stability, the invention provides for flanges to be formed at the lower ends of the aeration boxes, and for weld seams to be applied to their terminal surface areas, rather than to their angle sides.

To achieve uniform gas distribution, each of the individual aeration boxes in the aeration apparatus is provided with gas outlets identical in number and arrangement, whereby the aeration basin having activated sludge therein is effectively aerated.

An exemplary embodiment of the present invention is shown diagrammatically, partially in section, in the accompanying drawings, of which FIG. 1 is a cross-sectional view of an aeration basin subdivided into two halves;

Figure 1:
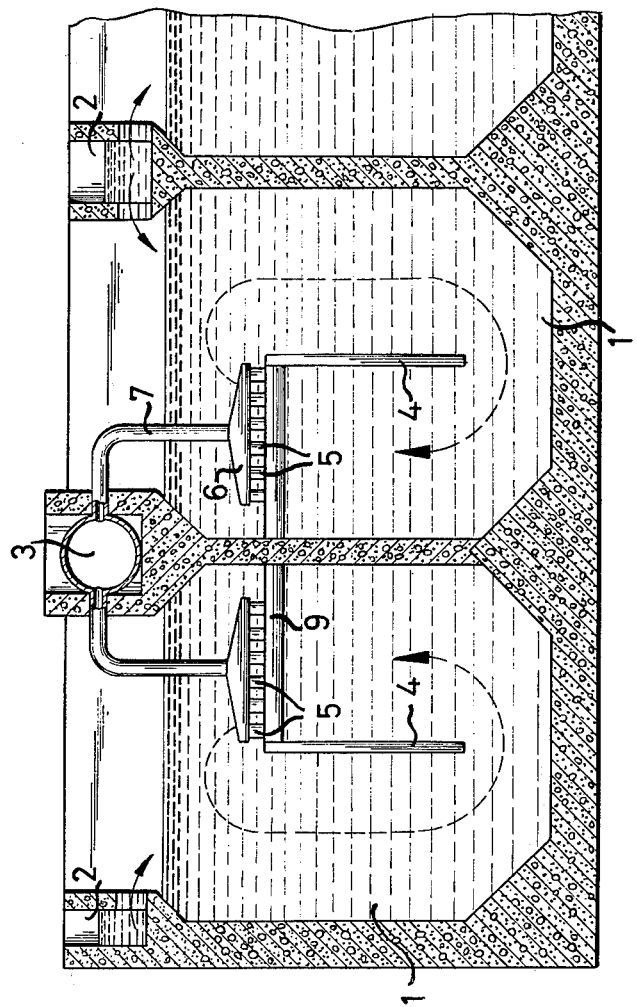
Figure 2:
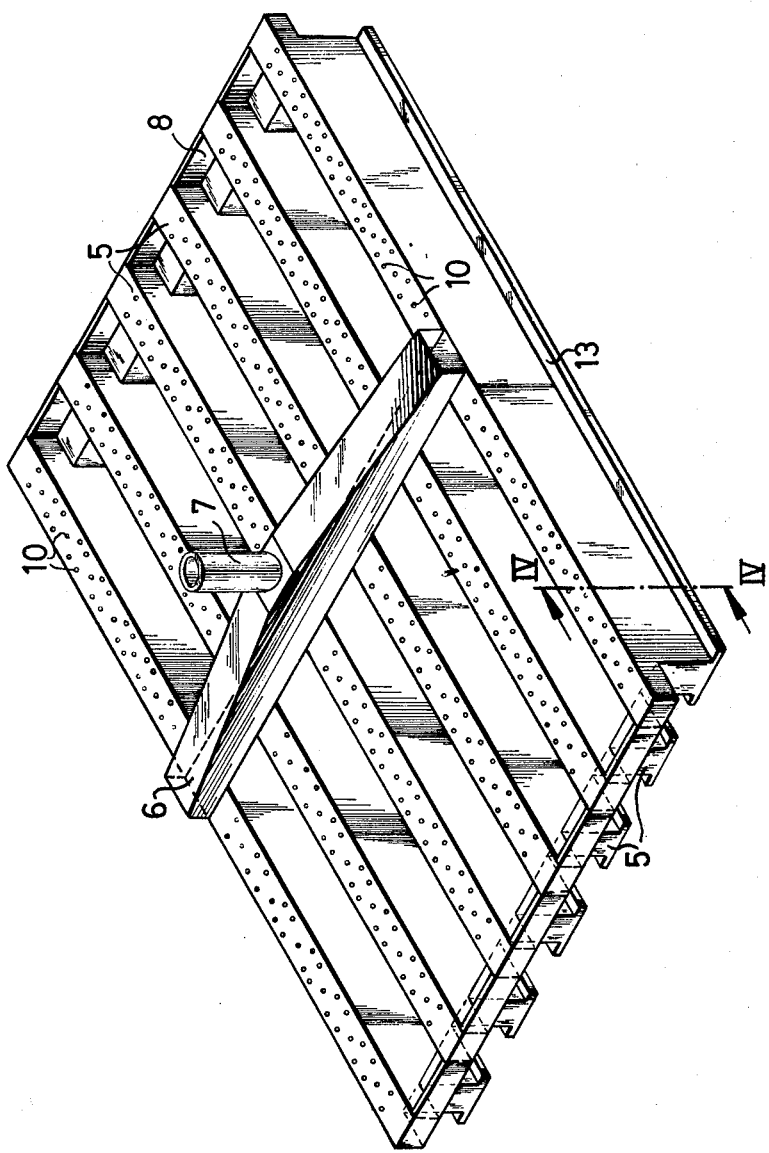
FIG. 2 is a perspective view of an aeration unit comprised of six aeration boxes in accordance with this invention.
Figure 3:
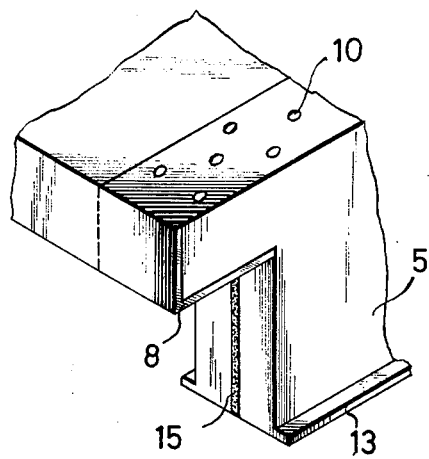
FIG. 3 is a representation on an enlarged scale of the terminal surface area of an aeration box provided with flanges at its lower end and with weld seams.

An aeration basin 1 subdivided into two halves having a rectangular cross-sectional area and bevelled lower ends has a conduit 2 and a conduit 3 disposed at its upper end, delivering effluent and oxygen-containing gas, respectively, to the basin 1. A partition wall 4 dipping in the basin is arranged in each of the two halves of the basin 1 subdividing it over its entire length into two further halves. Placed in each half-section of the basin 1 below the effluent level therein is a plurality of aeration boxes 5 of which the terminal surface areas are grouped together so as to form a unit by means of an angle piece 8. The aeration boxes 5, which are provided with regularly arranged gas outlets 10 at their upper ends and with outwardly-directed flanges at their lower ends, are supplied with the oxygen-containing gas through inlet 6 which communicates with conduit 3, through a pipe 7. Transverse frames 9 provide support for the terminal surface areas of the aeration boxes 5 and also for the partition wall 4. To improve the dimensional stability, the aeration boxes 5 are provided with weld seams 15, at their terminal surface areas.

Figure 4:
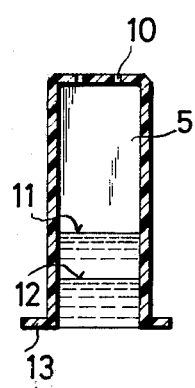
FIG. 4 is a sectional view taken along line IV — IV of FIG. 2.

As shown in FIG. 4, it is necessary for the aeration boxes 5 to have a certain height which is selected in accordance with the gas pressure produced by the blower, so as to prevent the oxygen-containing gas from escaping downwardly therefrom. Reference numeral 11 indicates the effluent level at normal working pressure, while reference numeral 12 indicates the effluent level under the maximum pressure produced by the blower.

Figure 5:
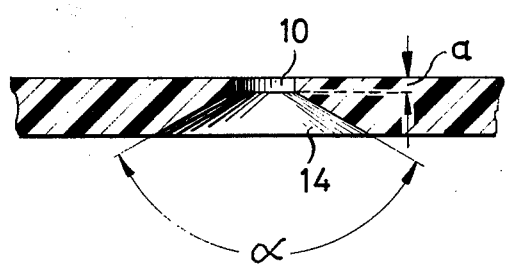
FIG. 5 is a representation of the upper end of an aeration box within the region of a gas outlet.

A counterbore 14, which includes an angle $\alpha$, is disposed in the plastics sheet, centrally around each of the individual gas outlets 10 (cf. FIG. 5). Within the region around the gas outlets 10, the plastics sheet has a residual wall thickness $a$.

An exemplary form of apparatus was operated with aeration boxes 5 made from polyethylene sheets 6 mm thick. The counterbore 14 included an angle of 120° and the residual wall thickness $a$ was 1 mm. The gas outlets 10 had a diameter of 5 mm. The upper ends of the aeration boxes 5 terminated approximately 80 mm below the effluent level.

We claim:

1. An apparatus for aerating effluents in an aeration basin, the basin being comprised of a plurality of aeration boxes placed parallel to each other, spaced apart from each other and connected together by a manifold, said aeration boxes having flattened horizontal upper sides and said upper sides being penetrated by a plurality of gas outlets, the apparatus being characterized in that the aeration boxes having a rectangular cross-sectional area and terminal surface areas, said aeration boxes comprise plastic material and are open at their bottoms; in that the aeration boxes are formed with outwardly directed flanges; in that weld seams are disposed upon said terminal surface area; in that each of the gas outlets is provided from below with a central counterbore including an angle $\alpha$ of at least 90°; and in that each counterbore leaves a residual wall thickness for the plastic material between 0.5 and 2 mm.

2. The apparatus as claimed in claim 1, wherein the aeration boxes are of polyethylene.

3. An apparatus as claimed in claim 1, wherein the counterbore includes an angle $\alpha$ of 120°.

4. The apparatus as claimed in claim 1 wherein the residual wall thickness for the plastic material is 1 mm.

5. The apparatus as claimed in claim 1 wherein the aeration basin has a sidewall, a transverse support frame extending horizontally from said sidewall below the level of the effluents in the basin and directly below the aeration boxes for supporting them, the outer end of the transverse support frame extending substantially midway into the basin, and a partition wall connected to and disposed downwardly from the outer end of the transverse wall with its lower end spaced from the bottom of the basin whereby the basin is centrally subdivided whereby a circulating flow of effluent is promoted upwardly through the aeration boxes and downwardly on the side of the partition wall remote from the aeration boxes.

6. The apparatus as claimed in claim 5 wherein the outwardly directed flanges of the aeration boxes rest upon the transverse support frame.

* * * * *